(12) United States Patent
Tomono

(10) Patent No.: US 8,413,981 B2
(45) Date of Patent: Apr. 9, 2013

(54) SHEET BUNDLE WITH STORAGE TAGS, METHOD OF MANUFACTURING THE SAME, AND SHEET TRANSPORT MECHANISM IN IMAGE FORMING APPARATUS

(75) Inventor: Keitaro Tomono, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 466 days.

(21) Appl. No.: 12/712,683

(22) Filed: Feb. 25, 2010

(65) Prior Publication Data

US 2010/0213662 A1 Aug. 26, 2010

(30) Foreign Application Priority Data

Feb. 26, 2009 (JP) ................................. 2009-044182

(51) Int. Cl.
*B65H 1/00* (2006.01)

(52) U.S. Cl. .................... 271/145; 414/788; 414/788.3; 414/788.9

(58) Field of Classification Search .................. 271/145; 414/788, 788.3, 788.9
See application file for complete search history.

(56) References Cited

U.S. PATENT DOCUMENTS

| | | | | |
|---|---|---|---|---|
| 6,842,606 | B1* | 1/2005 | Takemura | 455/41.1 |
| 7,880,904 | B2* | 2/2011 | Stenzel et al. | 358/1.12 |
| 7,891,663 | B2* | 2/2011 | Tsuruoka | 271/265.04 |
| 7,907,863 | B2* | 3/2011 | Miyata | 399/84 |
| 2006/0118229 | A1* | 6/2006 | Ohashi et al. | 156/60 |
| 2011/0062656 | A1* | 3/2011 | Shimosato et al. | 271/157 |

FOREIGN PATENT DOCUMENTS

| | | |
|---|---|---|
| EP | 1 033 675 A2 | 9/2000 |
| EP | 1 626 362 A1 | 2/2006 |
| JP | 2004-284250 | 10/2004 |
| JP | 2006-137453 | 6/2006 |
| JP | 2006-195065 A | 7/2006 |
| JP | 2006-253767 A | 9/2006 |
| JP | 2006-285380 A | 10/2006 |
| JP | 2007-15294 | 1/2007 |
| JP | 2007-15820 | 1/2007 |
| WO | WO 01/03058 A1 | 1/2001 |

OTHER PUBLICATIONS

Japanese Office Action dated Mar. 1, 2011 from related JP application 2009-044182 together with partial English language translation.
Japanese Office Action dated Dec. 14, 2010 together with partial English language translation.

* cited by examiner

*Primary Examiner* — Kaitlin Joerger
*Assistant Examiner* — Ernesto Suarez
(74) *Attorney, Agent, or Firm* — Scully, Scott, Murphy & Presser, PC

(57) ABSTRACT

A sheet bundle with storage tags, a method for producing the sheet bundle and a sheet transport mechanism in an image forming apparatus are provide. The sheet bundle includes a plurality of sheets stacked to one another, each sheet being attached with a storage tag at an attachment position and having a thickness larger at the attachment position than other positions thereof. The plurality of sheets includes a plurality of kinds of sheets which have different attachment positions when the sheet bundle is viewed from a direction orthogonal to a surface of the sheets.

21 Claims, 8 Drawing Sheets

US 8,413,981 B2

SHEET BUNDLE WITH STORAGE TAGS, METHOD OF MANUFACTURING THE SAME, AND SHEET TRANSPORT MECHANISM IN IMAGE FORMING APPARATUS

CROSS-REFERENCE TO RELATED APPLICATION

This application claims priority from Japanese Patent Application No. 2009-044182, filed on Feb. 26, 2009, the entire subject matter of which is incorporated herein by reference.

TECHNICAL FIELD

Aspects of the present invention relate to a sheet bundle with storage tags, a method of manufacturing the same, and a sheet transport mechanism in an image forming apparatus.

BACKGROUND

In recent years, there has been developed a technique which writes or read data with respect to a Radio Frequency IDentification tag (RFID tag) which is a storage tag (IC tag) including an IC chip and an antenna circuit, in a non-contact manner. Further, such a storage tag is attached to a print sheet, an image is printed on the sheet by a storage tag printer, and data is written to or read from the attached storage tag.

The sheet attached with the storage tag is formed by bonding an IC chip, an antenna circuit, a protective member, and the like onto a sheet base material, so that a position where the storage tag is attached becomes to have a thickness larger than other positions. Therefore, if a plurality of sheets with storage tags are stacked to one another to constitute a sheet bundle, the storage tags attached at the same positions of the respective sheets are stacked, so that the sheets would be curved such that the position is convex. As a result, the sheet bundle becomes bulky, and is inconvenient for conveyance or storage. Further, when the sheet bundle is set in a feed unit of a printer, the sheets are uneven, so the sheets would not be normally fed.

SUMMARY

Accordingly, it is an aspect of the present invention to provide a sheet bundle with storage tags which can reduce unevenness thereof, a method of manufacturing the same, and a sheet transport mechanism in an image forming apparatus.

According to an illustrative embodiment of the present invention, there is provided a sheet bundle With storage tags, comprising: a plurality of sheets stacked to one another, each sheet being attached with a storage tag at an attachment position and having a thickness larger at the attachment position than other positions thereof. The plurality of sheets includes a plurality of kinds of sheets which have different attachment positions when the sheet bundle is viewed from a direction orthogonal to a surface of the sheets.

According to another illustrative embodiment of the present invention, there is provided a method of manufacturing a sheet bundle including a plurality of sheets, each being attached with a storage tag at an attachment position and having a thickness larger at the attachment position than other position thereof, the method comprising: stacking a plurality of kinds of sheets to one another, the plurality kinds of sheets having different attachment positions when viewed from a direction orthogonal to a surface of the sheets.

According to a further illustrative embodiment of the present invention, there is provided a sheet transport mechanism in an image forming apparatus which includes: a forming unit configured to form an image on a sheet; and an access unit configured to perform an access operation including at least one of writing and reading of data with respect to a storage tag attached to the sheet, the sheet transport mechanism comprising: a transport unit configured to feed and transport a sheet of a sheet bundle set in a feed unit to the forming unit and the access unit. The sheet bundle includes a plurality of sheets stacked to one another, each sheet being attached with a storage tag at an attachment position and having a thickness larger at the attachment position than other positions thereof. The plurality of sheets includes a plurality of kinds of sheets which have different attachment positions when the sheet bundle is viewed from a direction orthogonal to a surface of the sheets.

According to the above configuration, the sheet bundle with storage tags includes a plurality of kinds of sheets having different attachment positions when viewed from a direction orthogonal to the surface of the sheets. Therefore, the attachment positions are dispersed without concentrating on one position, thereby reducing unevenness in the sheet bundle. Therefore, the bulkiness of the sheet bundle can be suppressed.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Illustrative embodiments of the present invention will be described with reference to the drawings.

(Sheet Bundle with RFID Tags)

Figure 1:
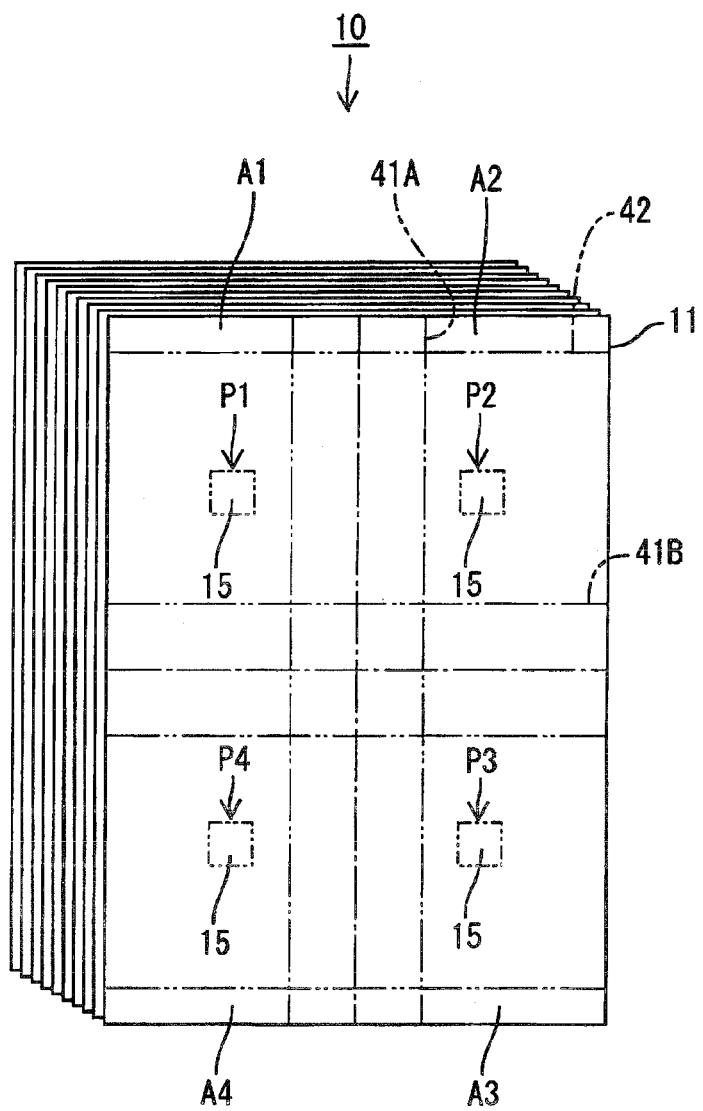
FIG. 1 is a plan view showing a sheet bundle with RFID tags according to an illustrative embodiment of the present invention.
Figure 2:
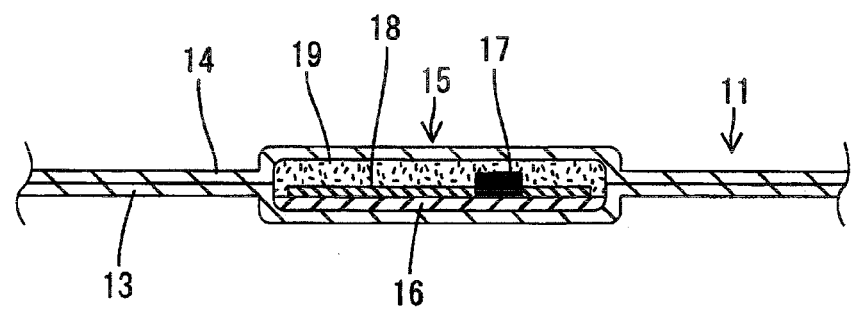
FIG. 2 is a partial enlarged sectional view of a sheet according to the illustrative embodiment of the present invention.

As shown in FIG. 1, a sheet bundle 10 includes a plurality of sheets 11 attached with RFID tags 15 (an example of storage tags) which are stacked to one another in the thickness direction. Each of the sheets 11 has a same rectangular shape and is substantially completely overlapped with each other. As shown in FIG. 2, each of the sheets 11 is configured such that an RFID tag 15 is sandwiched between a pair of base material sheets 13 and 14 made of paper, plastic or the like. The RFID tag 15 is configured such that an IC chip 17 and an antenna circuit 18 are provided at the top of a base film 16, and the top surface is covered with a protective member 19 made of a plastic sheet or the like, and has a flat plate shape as a whole. The sheets 11 have a thickness larger at a position where the RFID tag 15 is attached than other positions due to the thickness of the RFID tag 15.

Figure 3:
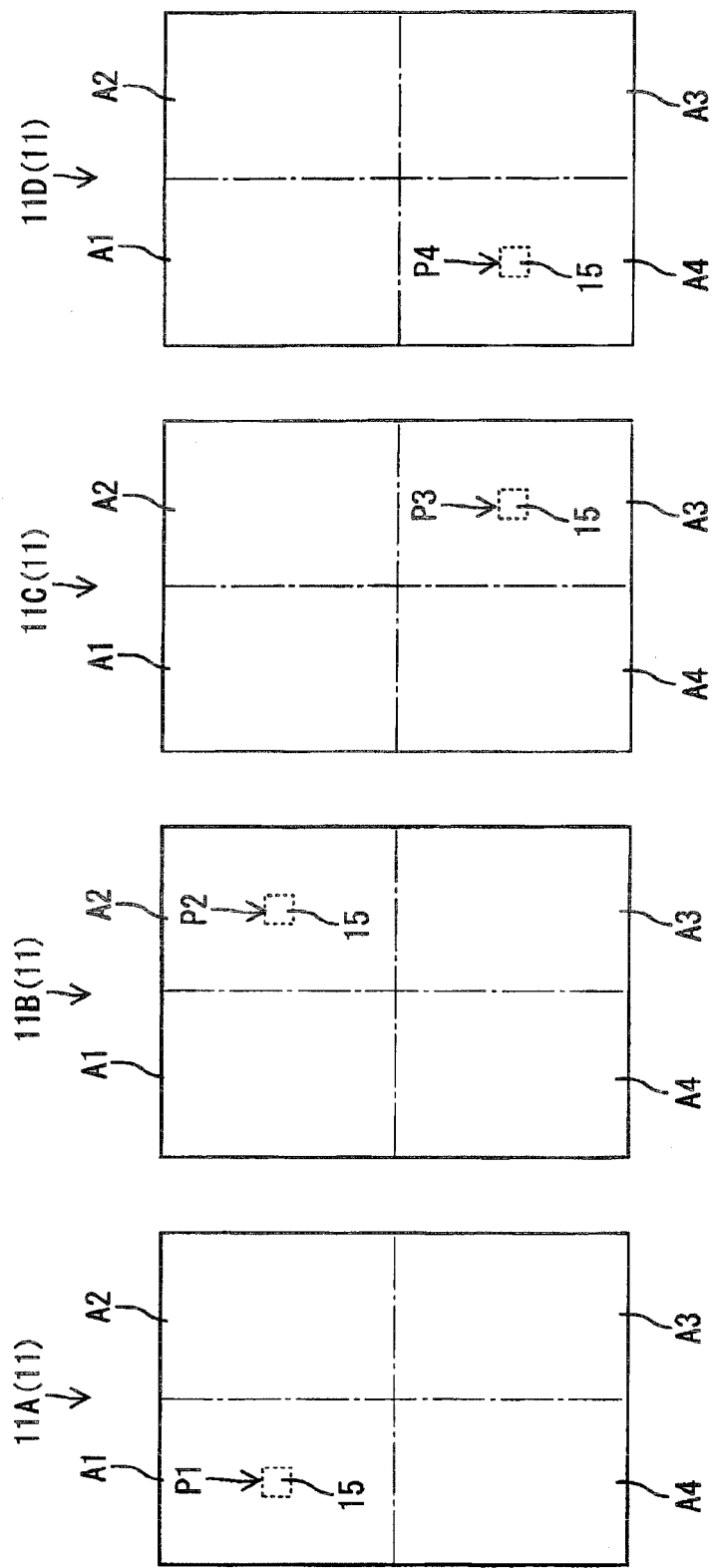
FIG. 3 is a plan view showing four kinds of sheets constituting the sheet bundle according to the illustrative embodiment of the present invention.

As shown in FIG. 3, the sheet bundle 10 includes four kinds of sheets 11A to 11D having different attachment positions P1 and P4 of the RFID tags 15 when viewed from a direction orthogonal to a surface of the sheets. In the following description, in order to distinguish the four kinds of sheets, suffixes are attached to reference numeral 11. Each of the sheets 11A to 11D is attached with one RFID tag 15. When the sheet surface is divided into four areas A1 and A4 by a center in a short side direction and a center in a long side direction, the RFID tag 15 of the sheet 11A is provided at the attachment position P1 in the area A1 on the upper left side of the drawing. Similarly, the RFID tag 15 of the sheet 11B is provided at the attachment position P2 in the area A2 on the upper right side of the drawing, the RFID tag 15 of the sheet 11C is provided at the attachment position P3 in the area A3 on the lower right side of the drawing, and the RFID tag 15 of the sheet 11D is provided at the attachment position P4 in the area A4 on the lower left side of the drawing. The four attachment positions P1 to P4 are symmetric with respect to a center in the short side direction and a center in the long side direction of the sheet 11.

Figure 4:
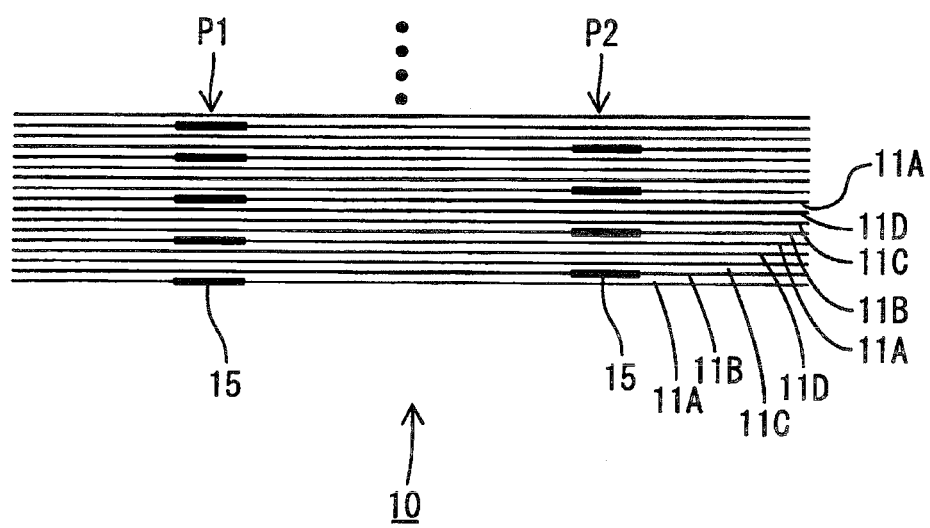
FIG. 4 is a schematic sectional view showing a stacked state of the sheet bundle according to the illustrative embodiment of the present invention.

As shown in FIG. 4, the sheet bundle 10 includes four kinds of sheets 11A to 11D stacked to one another in sequence in an overlap manner. That is, four kinds of sheets 11A to 11D are repeatedly provided in a sequence of 11A, 11B, 11C, 11D, 11A, 11B, 11C, 11D, 11A, . . . from below. In other words, the sheets 11 are overlapped such that the attachment position of the RFID tag 15 sequentially moves between the four positions P1, P2, P3, and P4 on a sheet-by-sheet basis, and makes one round for every four sheets.

Accordingly, as the whole of the sheet bundle 10, the substantially same number of RFID tags 15 are provided at the respective four attachment positions P1 to P4. Specifically, if the total number of sheets 11 constituting the sheet bundle 10 is a multiple of four, the number of RFID tags 15 at the respective attachment positions P1 to P4 becomes the same, and if the total number of sheets 11 is not a multiple of four, a difference between the maximum number and the minimum number of RFID tags 15 provided at the respective attachment positions P1 to P4 becomes one.

Figure 5:
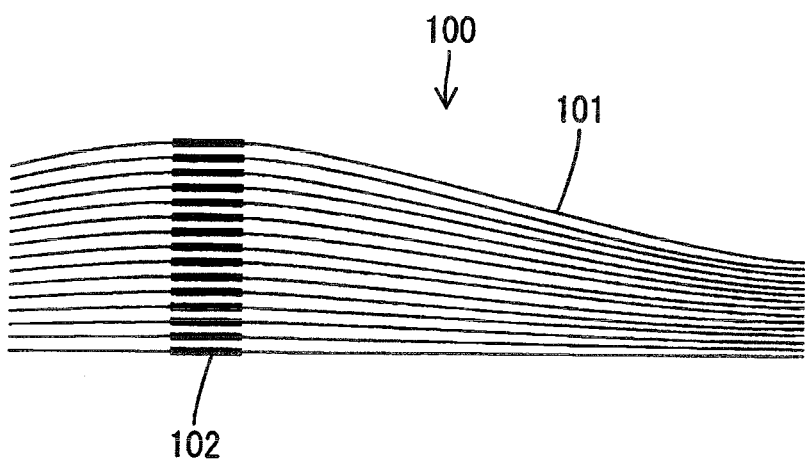
FIG. 5 is a schematic sectional view showing a sheet bundle of a comparative example.

A related-art sheet bundle 100 is shown in FIG. 5 as a comparative example. In this comparative example, the attachment positions of RFID tags 102 of respective sheets 101 constituting the sheet bundle 100 are all the same. Therefore, if a plurality of sheets 101 are stacked to one another to constitute the sheet bundle 100, the attachment positions of the RFID tags 102 are significantly swollen, and unevenness or inclination occurs in the posture of the sheets 101.

In contrast, in the sheet bundle 10 according to the illustrative embodiment of the present invention, since the attachment positions P1 to P4 of the RFID tags 15 are dispersed into four attachment positions, the height (thickness) of the entire sheet bundle 10 can be reduced, as compared with the comparative example where only one attachment position is provided. In particular, the substantially same number of RFID tags 15 are provided at the respective attachment positions P1 to P4, so the number of RFID tags 15 provided at one of the attachment positions P1 to P4 substantially becomes ¼, as compared with a case where only one attachment position is provided. Therefore, when the sheet bundle 10 is placed, the convex portions formed at the respective attachment positions P1 to P4 substantially have a uniform height. As a result, unevenness or inclination of the sheets 11 is reduced, and the respective sheets 11 become close to a horizontal state.

As described above, the sheet bundle 10 according to the illustrative embodiment of the present invention includes a plurality of kinds of sheets having different attachment positions P1 to P4 of the RFID tags 15 when viewed from the direction orthogonal to the surface of the sheets. Therefore, the attachment positions P1 to P4 of the RFID tags 15 are dispersed without concentrating on one position, thereby reducing unevenness in the sheet bundle 10. Therefore, the bulkiness of the sheet bundle 10 can be suppressed. As result, when the sheet bundle 10 is packaged, the package can be compact, and is convenient for conveyance or storage. Further, when the sheet bundle 10 is used in an image forming apparatus, good stackability can be achieved.

In the sheet bundle 10, the substantially same number of RFID tags 15 are provided at the respective attachment positions P1 to P4 of the RFID tags 15. Therefore, the convex portions formed at the attachment positions P1 to P4 of the RFID tags 15 substantially have a same height, so that unevenness in the entire sheet bundle 10 can be suppressed.

In the sheet bundle 10, each kind of the sheets 11A to 11D having different attachment positions P1 to P4 of the RFID tags 15 is provided for a predetermined number of sheets 11. That is, the sheets 11A to 11D having the same attachment positions P1 to P4 of the RFID tags 15 are not provided successively beyond the predetermined number of sheets, so that unevenness or inclination of the sheets 11 in the sheet bundle 10 can be reduced. Therefore, for example, even when only a part of the sheet bundle 10 is extracted or a part of the sheet bundle 10 is consumed in an image forming apparatus, unevenness in the sheet bundle 10 can be reduced.

In particular, in the above-described sheet bundle 10, each kind of the sheets 11A to 11D having different attachment positions P1 to P4 of the RFID tags 15 is provided in order on a sheet-by-sheet basis. That is, the attachment positions P1 to P4 of the RFID tags 15 are different between adjacent sheets 11, and therefore, unevenness or inclination of the sheets 11 in the sheet bundle 10 can be further reduced.

The sheets 11 are provided such that the same number of RFID tags 15 are provided at the respective attachment positions P1 to P4 of the RFID tags 15 at every predetermined number (four in the above-described illustrative embodiment) of sheets. Therefore, for example, even when only a part of the sheet bundle 10 is extracted or a part of the sheet bundle 10 in the image forming apparatus is consumed, the substantially same number of RFID tags 15 are provided at the respective attachment positions P1 to P4 of the RFID tags 15. Therefore, the convex portions formed at the respective attachment positions P1 to P4 of the RFID tags 15 substantially have a uniform height.

(Sheet Transport Mechanism in Printer)

Next, a sheet transport mechanism in a printer 30 as an example of an image forming apparatus according to an illustrative embodiment will be described.

Figure 6:
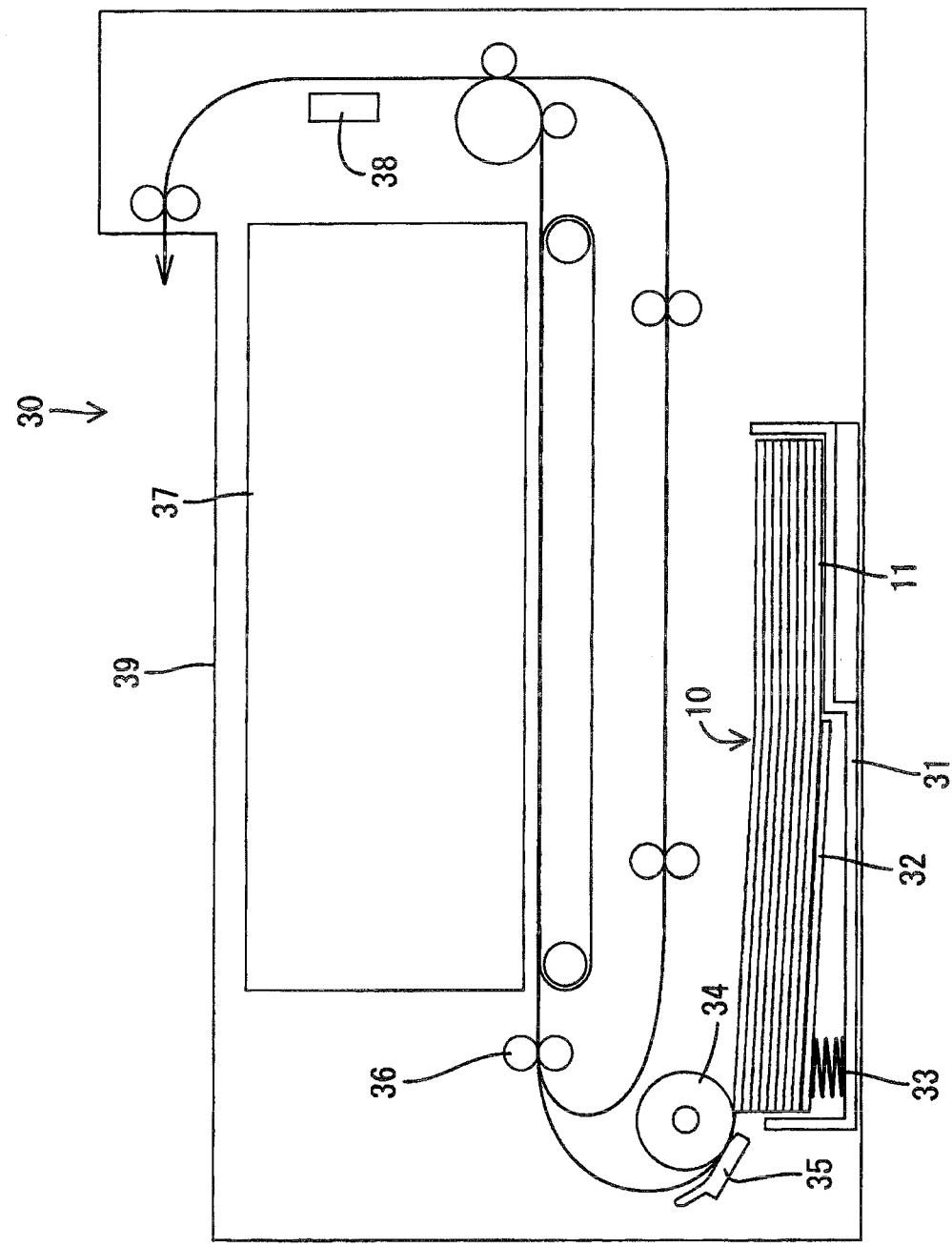
FIG. 6 is a schematic side sectional view of a printer according to an illustrative embodiment of the present invention.

As shown in FIG. 6, the printer 30 includes a feed tray 31 (an example of a feed unit) in which the sheet bundle 10 is stacked. In the feed tray 31, the sheet bundle 10 can be stacked in a portrait mode and a landscape mode. That is, the sheets 11 can be transported along one of the long side direction and the short side direction of the sheet 11.

A swingable sheet pressing plate 32 is provided at the bottom of the feed tray 31. The sheet pressing plate 32 is pressed upward by one or a plurality of spring members 33. The front portion of the sheet bundle 10 stacked in the feed tray 31 is moved up by the sheet pressing plate 32, and the uppermost sheet 11 is pressed against a feed roller 34 provided above the front portion of the feed tray 31. The sheets 11 in contact with the feed roller 34 are fed forward by rotation of the feed roller. The fed sheets 11 are caught one by one when being sandwiched between the feed roller 34 and a separation pad 35 pressed toward the feed roller 34.

The sheet 11 fed from the feed roller 34 is transported to an image forming position of an image forming unit 37 (an example of a forming unit) by a registration roller 36. The image forming unit 37 forms an image on the sheet 11 by using one color or a plurality of colors of coloring agent (ink or toner). The sheet 11 having passed through the image forming position is transported to an access position of an IC reader/writer 38 (an example of an access unit). The IC reader/writer 38 has a function to communicate with the RFID tag 15 attached to the sheet 11 by electric waves in order to either read data recorded in the RFID tag 15 or write data to the RFID tag 15, or in order to both read and write data with respect to the RFID tag 15 (hereinafter, these operations are referred to as access operations). The sheet 11 having passed through the access position is discharged onto a discharge tray 39 provided at the upper part of the printer 30.

The feed roller 34 is provided at the center in a direction orthogonal to a transport direction of the sheet 11. FIG. 1 shows a contact range 41A of the feed roller 34 when the sheet bundle 10 is set in the portrait mode (the sheet 11 is transported along the long side direction) and a contact range 41B of the feed roller 34 when the sheet bundle 10 is set in the landscape mode (the sheet 11 is transported along the short side direction). As shown in FIG. 1 the attachment positions P1 to P4 of the RFID tags 15 in the sheet bundle 10 are provided outside the contact ranges 41A and 41B of the feed roller 34. Therefore, an influence of unevenness of the RFID tag 15 on the feeding of the sheet 11 is suppressed, and the sheet 11 can be smoothly fed.

As shown in FIG. 1, when the sheet 11 is transported along the short side direction, the IC reader/writer 38 can perform an access operation (communication with the RFID tag 15) within an access range 42 which is a part of the sheet 11. When the sheet 11 is transported along the long side direction, the entire surface of the sheet 11 is included in the access range 42. That is, the attachment positions P1 to P4 of the RFID tags 15 are provided within the access range 42. Therefore, occurrence of errors of the access operation can be suppressed.

The sheet bundle 10 is such that the attachment positions P1 to P4 of the RFID tags 15 are provided on both sides with respect to the center in one side direction (for example, the short side direction) of the sheet 11. Therefore, the attachment positions P1 to P4 of the RFID tags 15 are not biased to one side in the one side direction (short side direction). Therefore, when the sheet bundle 10 is set in the feed tray 31 of the printer 30, the sheets 11 can be prevented from being inclined in the one side direction. As a result, when the sheets 11 are fed from the feed tray 31 along the direction (for example, the long side direction) orthogonal to one side direction, the sheets 11 can be smoothly fed.

When the sheet bundle 10 is viewed from the direction orthogonal to the surface of the sheet, the position of the gravity center for all of the RFID tags 15 is provided at the center in the one side direction. Therefore, the sheet bundle 10 in the one side direction is excellent in weight balance. As described above, if a sheet feed mechanism of the printer 30 for the sheet bundle 10 is configured such that the sheet bundle 10 is moved up from below by using an elastic force of a spring member 33 or the like, the sheet bundle 10 is not inclined in one side direction due to weight bias and comes into contact with the feed roller 34 in an upright state. As a result, the sheets 11 can be stably fed.

The attachment positions P1 to P4 of the RFID tags 15 are provided on both sides with respect to the center in the direction (for example, the long side direction) orthogonal to the one side direction of the sheet 11. Therefore, the bias of the attachment positions P1 to P4 of the RFID tags 15 in the orthogonal direction can be reduced. Therefore, when the sheet bundle 10 is set in the feed tray 31 of the printer 30, the sheets 11 can be prevented from being inclined in the orthogonal direction. As a result, when the sheets 11 are fed from the feed tray 31 along the one side direction (for example, the short side direction), the sheets 11 can be smoothly fed.

When the sheet bundle 10 is viewed from the direction orthogonal to the surface of the sheet, the position of the gravity center for all of the RFID tags 15 is provided at the center in the one side direction and the direction orthogonal to the one side direction. Therefore, the entire sheet bundle 10 is excellent in weight balance. For example, as described above, if the sheet feed mechanism of the printer 30 for the sheet bundle 10 is configured such that the sheet bundle 10 is moved up from below by using the elastic force of the spring member 33 or the like, the sheet bundle 10 is not inclined due to weight bias and comes into contact with the feed roller 34 in the upright state. As a result, the sheets 11 can be stably fed.

(Method of Manufacturing Sheet Bundle)

Next, a method of manufacturing the sheet bundle 10 according to an illustrative embodiment will be described.

Figure 7:
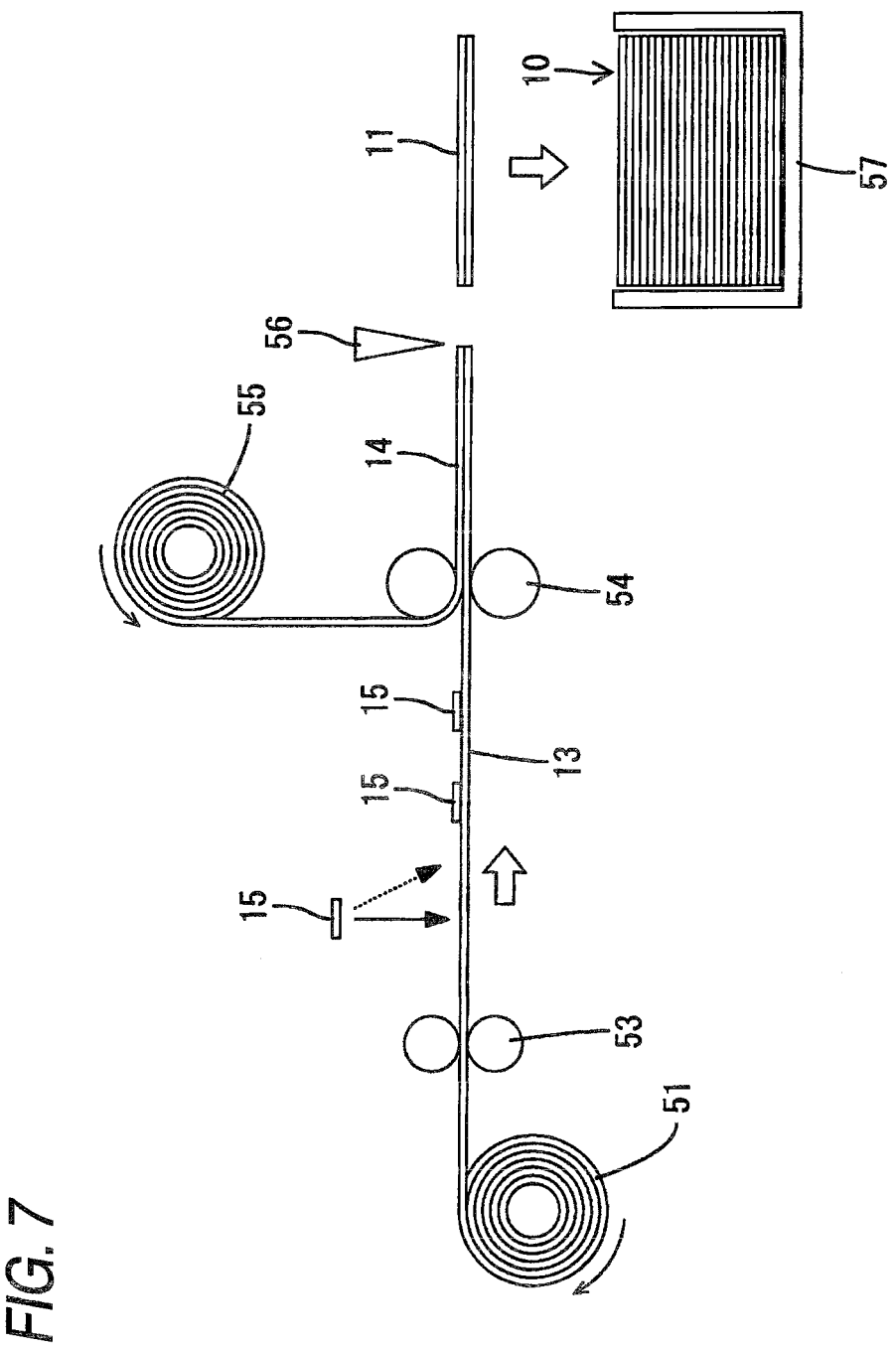
FIG. 7 is a diagram showing a method of manufacturing a sheet bundle according to an illustrative embodiment of the present invention.

As shown in FIG. 7, first, a band shape base material sheet 13 made of paper is supplied from a base material sheet winding 51. The base material sheet 13 is transported from a nip roller 53 toward a nip roller 54. In the meantime, an RFID tag 15 is attached on the top surface of the base material sheet 13 by a tag attaching apparatus (not shown). In this case, for example, a pressure-sensitive adhesive film (not shown) is applied to the top surface of the base material sheet 13 (not shown), such that the RFID tag 15 is adhered and fixed.

In this case, the four kinds of sheets 11A to 11D are sequentially manufactured one by one, and the attachment position of the RFID tag 15 on the base material sheet 13 is sequentially changed depending on the kinds of the sheets 11A to 11D. That is, the tag attaching apparatus moves the attachment position of the RFID tag 15 to a position of a next sheet of the sheets 11A to 11D each time one RFID tag 15 is attached on the base material sheet 13.

A base material sheet 14 supplied from a different base material sheet winding 55 is adhered to the top surface of the base material sheet 13 on which the RFID tag 15 is attached, and pressed by the nip roller 54. Thereafter, the base material sheets 13 and 14 are cut to have a size corresponding to the sheet 11 by a cutter 56, and the cut sheets 11 are sequentially stacked on a tray 57. If a predetermined number of sheets 11 are stacked on the tray 57, the completed sheet bundle 10 is pulled out from the tray 57 and packaged.

Accordingly, the attachment positions P1 to P4 of the RFID tags 15 of the respective sheets 11 are changed in a predetermined sequence, such that the sheet bundle 10 can be efficiently manufactured.

Other Illustrative Embodiments

While the present invention has been shown and described with reference to certain illustrative embodiments thereof, it will be understood by those skilled in the art that various changes in form and details may be made therein without departing from the spirit and scope of the invention as defined by the appended claims.

(1) In the above-described illustrative embodiment, the sheets having different RFID tag attachment positions are formed one by one and stacked. However, the present invention is not limited thereto. For example, sheets having different attachment positions may be formed separately, sheet bundles of the respective kinds of sheets may be formed, and sheets may be extracted from the respective sheet bundles in a predetermined sequence and stacked. In this case, if the directivity of the sheet is not cared, sheets may be extracted from one sheet bundle including sheets attached with storage tags at the same position, and the extracted sheets are rotated around the axis orthogonal to the sheet surface or turned over, such that the sheets may be used as a different kind of sheets having storage tags at different positions.

(2) In the above-described illustrative embodiment, the attachment positions of the RFID tags differ at every single sheet. However, the present invention is not limited thereto. That is, the attachment positions of the RFID tags may differ at every predetermined number of sheets, for example, at every two or more sheets. For example, when the sheets 11A to 11D having different attachment positions P1 to P4 of the RFID tags 15 are provided at every two sheets, the attachment positions P1 to P4 of the RFID tags 15 may be provided in a sequence of "P1, P1, P2, P2, P3, P3, P4, P4, P2, P2, P4, P4, . . . ".

(3) In the above-described illustrative embodiment, the same number of RFID tags are provided at the respective attachment positions of the RFID tags for every four sheets. However, the present invention is not limited thereto. Such number of sheets may be appropriately changed. For example, when the attachment positions of the RFID tags are provided in a sequence of "P2, P1, P1, P2, P3, P4, P4, P3, P2, P1, P1, P2, . . . ", the same number of RFID tags are provided at the respective attachment positions P1 to P4 of the RFID tags 15 for every eight sheets.

(4) In the above-described illustrative embodiment, the number of attachment positions of the RFID tags in the sheet bundle is four. However, the present invention is not limited thereto. For example, the number of attachment positions of the RFID tags may be two, and the sheets with storage tags provided at the respective attachment positions may be alternately provided at every single sheet. The number of attachment positions of the RFID tags in the sheet bundle may be three, or five or more. If the number of attachment positions increases, multiple kinds of sheets having different attachment positions have be prepared, so that such manufacturing method may cause an increase of costs. If the number of attachment positions is suppressed to small, an increase of costs can be suppressed.

(5) In the above-described illustrative embodiment, the substantially same number of RFID tags are dispersed into four areas. However, the present invention is not limited thereto. For example, the storage tags may be provided so as to be biased to some areas. Although in the above-described illustrative embodiment, the same number of RFID tags are provided at the respective attachment positions of the RFID tags or the difference of the RFID tags is one. However, the difference of the number of RFID tags may be more than one. Even when the difference is two or more, unevenness in the sheet bundle can also be reduced.

(6) In the above-described illustrative embodiment, the sheets can be transported along both the long side direction and the short side direction. However, the present invention is not limited thereto. That is, the sheets may be transported along only one direction.

(7) In the above-described illustrative embodiment, the sheets are provided such that the attachment positions of the RFID tags are changed in a predetermined sequence. However, the present invention is not limited thereto. For example, the attachment position of the sheets (or the kinds of sheets) may be determined randomly based on a random number or the like.

(8) In the above-described illustrative embodiment, the substantially same number of attachment positions of the RFID tags are provided on both sides with respect to the center in one side direction of the sheet or an orthogonal direction of the one side direction. However, the present invention is not limited thereto. That is, a storage tag may be provided at the center in the one side direction. In this case, it may be understood that the recording tag is provided on both sides by half.

Figure 8:
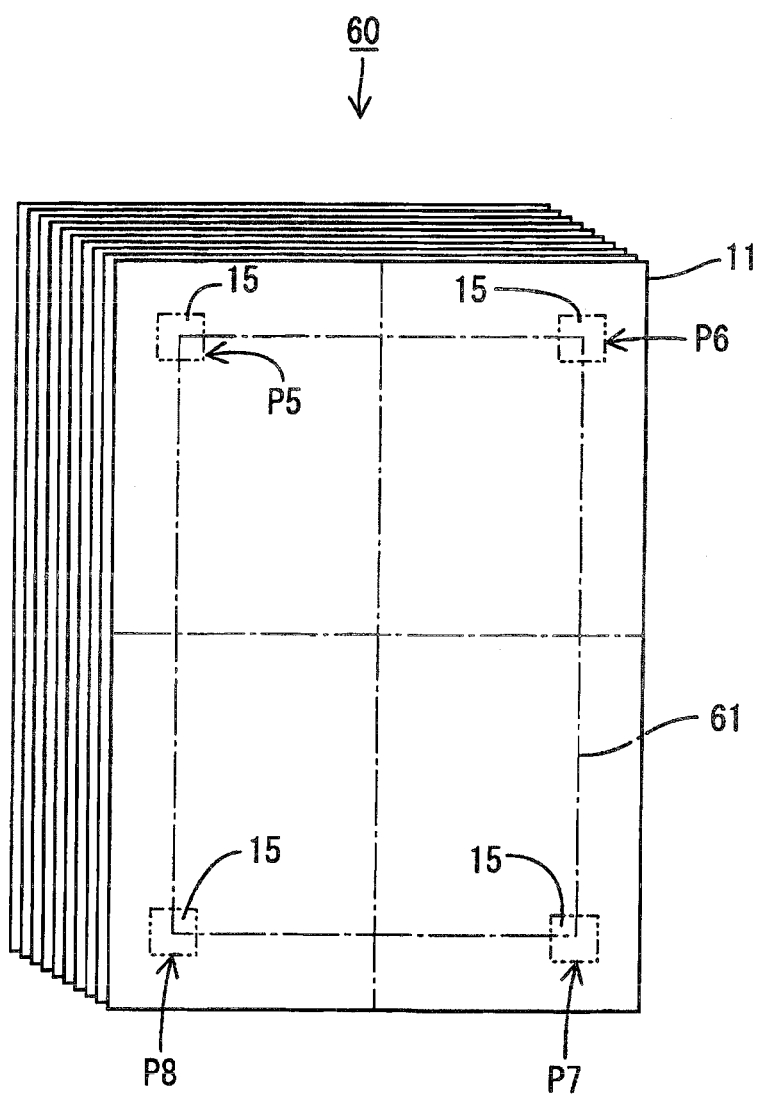
FIG. 8 is a plan view showing a sheet bundle according to another illustrative embodiment of the present invention.

(9) Like a sheet bundle 60 shown in FIG. 8, when the image forming range 61 in which the image forming apparatus is capable of forming an image is a part of the sheet 11, at least a part of attachment positions P5 to P8 of the RFID tags 15 may be provided outside the image forming range 61. In this case, an influence of unevenness of the RFID tag 15 in the sheet 11 on image formation can be suppressed, thereby ensuring image quality. In particular, if all of the attachment positions P5 to P8 of the RFID tags 15 are provided outside the image forming range 61, an influence of unevenness of the RFID tag 15 on image formation can be more effectively suppressed.

Figure 9:
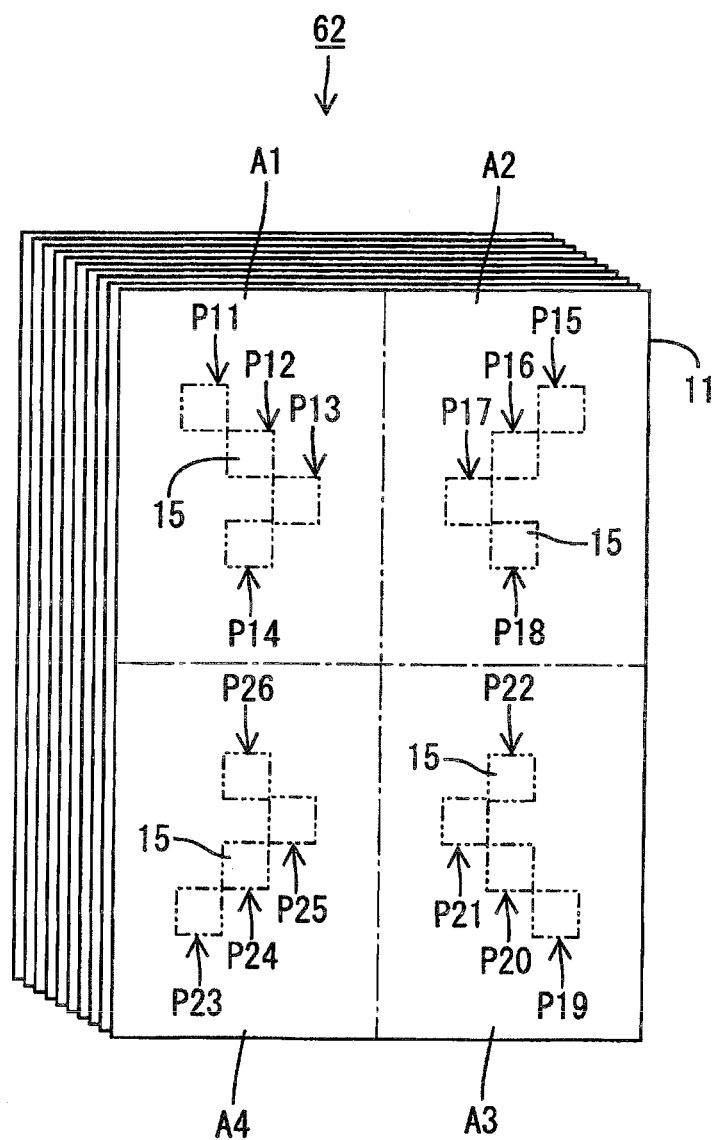
FIG. 9 is a plan view showing a sheet bundle according to a further illustrative embodiment of the present invention.

(10) The sheet bundle may be configured such that the attachment positions of the storage tags differ among all of the sheets. For example, a sheet bundle 62 shown in FIG. 9 includes sixteen sheets 11 each attached with one RFID tag 15. The sheets 11 have different attachment positions P11 to P26 of the RFID tags 15. In the sheet bundle 62, four of the attachment positions P11 to P26 of the RFID tags 15 are dispersed in each of the four areas A1 to A4, and the gravity center for all the RFID tags 15 is at the center of the sheets, thereby achieving excellent balance. Therefore, the thickness of the sheet bundle 62 can be more effectively suppressed.

Between adjacent sheets 11, the attachment positions P11 to P26 of the RFID tags 15 may be provided so as not to be biased. Specifically, the attachment positions P11 to P26 of the RFID tags 15 may be dispersed as follows: "P11 in the area A1, P15 in the area A2, P19 in the area A3, P23 in the area A4, P12 in the area A1, . . . ". In this case, unevenness or inclination of the sheets 11 in the sheet bundle 62 can be reduced.

Figure 10:
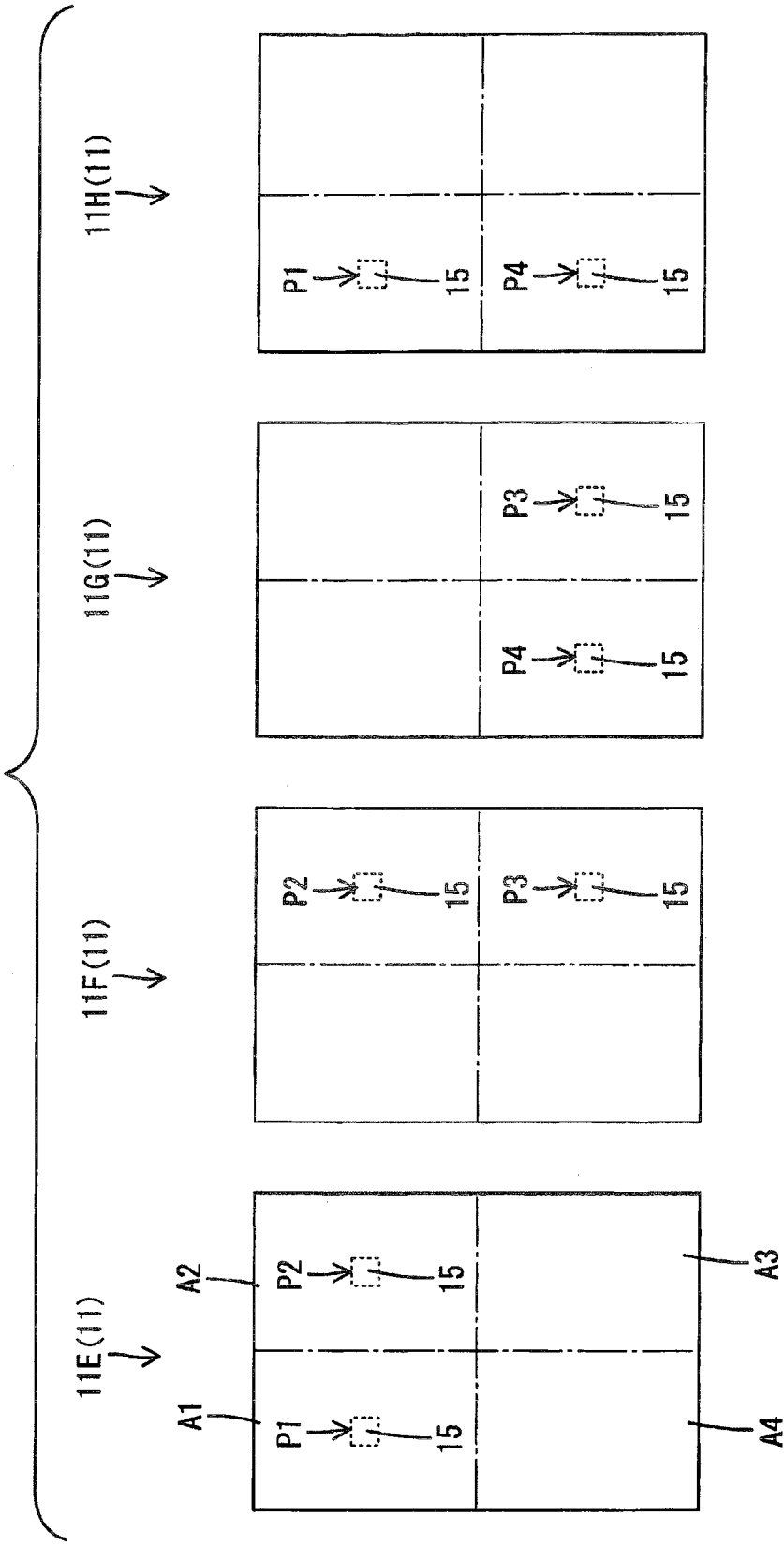
FIG. 10 is a plan view showing four kinds of sheets constituting a sheet bundle according to a further illustrative embodiment of the present invention.

(11) In the above-described illustrative embodiment, one RFID tag is attached to one sheet. However, the present invention is not limited thereto. That is, a plurality of RFID tags may be attached to one sheet. For example, as shown in FIG. 10, a sheet bundle may include four kinds of sheets 11P to 11H each having two RFID tags 15 and having different combination of attachment positions P1 to P4 of the RFID tags 15.

(12) Model information of an image forming apparatus compatible with the RFID tag of the sheet bundle may be stored. When the sheet bundle is set in the image forming apparatus and image formation or an access operation is performed, the model information may be referenced, and when the image forming apparatus is not compatible with the RFID tag, image formation or the like may be prohibited. In this case, image formation can be prevented from being executed by an image forming apparatus not compatible with the RFID tag.

(13) In the above-described illustrative embodiment, the attachment positions of the RFID tags do not overlap with each other entirely. However, the present invention is not limited thereto. That is, if the positions of the storage tags are different, a part of the RFID tags may be overlapped with each other.

(14) The present invention may be applied to sheets which have another shape than the rectangular shape.

The present invention provides illustrative, non-limiting embodiments as follows:

[1] A sheet bundle with storage tags comprises: a plurality of sheets stacked to one another, each sheet being attached with a storage tag at an attachment position and having a thickness larger at the attachment position than other positions thereof, wherein the plurality of sheets includes a plurality of kinds of sheets which have different attachment positions when the sheet bundle is viewed from a direction orthogonal to a surface of the sheets.

According to the configuration of [1], the sheet bundle includes a plurality of sheets having different attachment positions. Therefore, the attachment positions are dispersed without concentrating on one position, thereby reducing unevenness in the sheet bundle. Therefore, the bulkiness of the sheet bundle can be suppressed.

[2] In the sheet bundle according to [1], each of the sheets may have a rectangular shape, and the attachment positions of the plurality of kinds of sheets may be provided on both sides with respect to a center in one side direction of the sheets.

According to the configuration of [2], the attachment positions are provided on both sides with respect to the center in the one side direction of the sheet. That is, the attachment positions are not provided only on one side in the one side direction. Therefore, for example, when the sheet bundle is set in a feed unit of a printer, the sheets can be prevented from being inclined in the one side direction. As a result, when the sheets are fed from the feed unit in a direction orthogonal to one side direction, the sheets can be smoothly fed.

[3] In the sheet bundle according to [2], when the sheet bundle is viewed from the direction orthogonal to the surface of the sheets, a position of a gravity center for all of the storage tags may be provided at the center in the one side direction of the sheets.

According to the configuration of [3], the sheet bundle in the one side direction is excellent in weight balance. For example, if a sheet feed mechanism of an image forming apparatus for the sheet bundle is configured such that the sheet bundle is moved up from below by using an elastic force of a spring or the like, the sheet bundle is not inclined in one side direction due to weight bias, and as a result, the sheets can be stably fed.

[4] In the sheet bundle according to [2] or [3], the attachment positions of the plurality of kinds of sheets may be provided on both sides with respect to a center in a direction orthogonal to the one side direction of the sheets.

According to the configuration of [4], the attachment positions are further provided on both sides with respect to the center in the direction orthogonal to the one side direction of the sheet. Therefore, the bias of the attachment positions in the orthogonal direction can also be reduced. Further, for example, when the sheet bundle is set in the feed unit of the image forming apparatus, the sheets can be prevented from being inclined in the orthogonal direction. As a result, when the sheets are fed from the feed unit in the one side direction, the sheets can be smoothly fed.

[5] In the sheet bundle according to [4], when the sheet bundle is viewed from the direction orthogonal to the surface of the sheets, a position of a gravity center for all of the storage tags may be provided at the center of the sheets.

According to the configuration of [5], the entire sheet bundle is excellent in weight balance. For example, if the sheet feed mechanism of the image forming apparatus for the sheet bundle is configured such that the sheet bundle is moved up from below by using an elastic force of a spring or the like, the sheet bundle is not inclined due to weight bias, and as a result, the sheets can be stably fed.

[6] In the sheet bundle according to any one of [1] to [5], a substantially same number of storage tags may be provided at the respective attachment positions.

According to the configuration of [6], convex portions formed at the respective attachment positions substantially have a uniform height, and therefore, unevenness in the entire sheet bundle can be suppressed.

[7] In the sheet bundle according to any one of [1] to [6], the plurality of sheets may be stacked such that the sheets having different attachment positions are provided at every predetermined number of sheets.

According to the configuration of [7], sheets having the same attachment position are not provided successively beyond a predetermined number of sheets, so that unevenness or inclination of the sheets in the sheet bundle can be reduced. Therefore, for example, even when only a part of the sheet bundle is extracted or a part of the sheet bundle is consumed in the image forming apparatus, unevenness in the sheet bundle can be reduced.

[8] In the sheet bundle according to [7], the plurality of sheets may be stacked such that the sheets having different attachment positions are provided at every single sheet.

According to configuration of [8], the attachment positions are different between adjacent sheets, and therefore, unevenness or inclination of the sheets in the sheet bundle can be further reduced.

[9] In the sheet bundle according to any one of [1] to [8], the plurality of sheets may be stacked such that a same number of storage tags are provided at the respective attachment positions for every predetermined number of sheets.

According to the configuration of [9], for example, even when only a part of the sheet bundle is extracted or a part of the sheet bundle in the image forming apparatus is consumed, the substantially same number of storage tags are provided at the respective attachment positions, and therefore, the convex portions formed at the respective attachment positions substantially have a uniform height.

[10] In the sheet bundle according to any one of [1] to [9], the plurality of sheets may be stacked such that the attachment positions are changed in a predetermined sequence.

According to the configuration of [10], the attachment positions are changed in the predetermined sequence, so the sheet bundle can be efficiently manufactured.

[11] In the sheet bundle according to any one of [1] to [10], the attachment positions of all the plurality of sheets may be different.

According to the configuration of [11], the attachment positions are different among all of the sheets. Therefore, the thickness of the sheet bundle can be effectively suppressed.

[12] The sheet bundle according to any one of [1] to [11] may be used in an image forming apparatus which includes: a feed unit; a forming unit configured to form an image on a sheet; an access unit configured to perform an access operation including at least one of writing and reading of data with respect to a storage tag; and a transport unit configured to transport a sheet, wherein the transport unit includes a feed roller configured to contact an uppermost sheet of the sheet bundle set in the feed unit and rotate to feed the uppermost sheet. At least a part of each of the attachment positions may be provided outside a contact range of the feed roller.

According to the configuration of [12], transport of a sheet from the sheet bundle by rotation of the feed roller can be prevented from being influenced by unevenness due to the storage tags, and therefore, the sheets can be smoothly fed.

[13] The sheet bundle according to any one of [1] to [11] may be used in an image forming apparatus which includes: a forming unit configured to form an image within an image forming range which is a part of a sheet; an access unit configured to perform an access operation including at least one of writing and reading of data with respect to a storage tag; and a transport unit configured to transport a sheet. At least a part of each of the attachment positions may be provided outside the image forming range.

According to the configuration of [13], an influence of unevenness due to the storage tag of the sheet on image formation can be suppressed, so image quality can be ensured.

[14] The sheet bundle according to any one of [1] to [11] may be used in an image forming apparatus which includes: a forming unit configured to form an image on a sheet; an access unit configured to perform an access operation including at least one of writing and reading of data with respect to a storage tag within a access range; and a transport unit configured to transport a sheet. The attachment positions are provided within the access range.

According to the configuration of [14], occurrence of errors of the access operation can be suppressed.

[15] A method of manufacturing a sheet bundle including a plurality of sheets, each being attached with a storage tag at an attachment position and having a thickness larger at the attachment position than other position thereof, comprises: stacking a plurality of kinds of sheets to one another, the plurality kinds of sheets having different attachment positions when viewed from a direction orthogonal to a surface of the sheets.

According to the configuration of [15], a plurality of kinds of sheets having different attachment positions when viewed from a direction orthogonal to the sheet surface so as to manufacture the sheet bundle with storage tags. Therefore, the attachment positions are dispersed without concentrating on one position, thereby reducing unevenness in the sheet bundle. As a result, the bulkiness of the sheet bundle can be suppressed.

[16] In the method according to [15], the stacking may be performed such that a substantially same number of storage tags are provided at the respective attachment positions.

According to the configuration of [16], convex portions formed at the respective attachment positions substantially have a uniform height, and as a result, unevenness in the entire sheet bundle can be suppressed.

[17] In the method according to [15] or [16], the stacking may be performed such that a same number of storage tags are provided at the respective attachment positions for every predetermined number of sheets.

According to the configuration of [17], for example, even when only a part of the sheet bundle is extracted or a part of the sheet bundle in the image forming apparatus is consumed, the substantially same number of storage tags are provided at the respective attachment positions, and as a result, convex portions formed at the respective attachment positions have a uniform height.

[18] The method according to any one of [15] to [17], the stacking may be performed such that the attachment positions are changed in a predetermined sequence.

According to the configuration of [18], the sheet bundle can be efficiently manufactured.

[19] A sheet transport mechanism in an image forming apparatus which includes: a forming unit configured to form an image on a sheet; and an access unit configured to perform an access operation including at least one of writing and reading of data with respect to a storage tag attached to the sheet, comprises: a transport unit configured to feed and transport a sheet of a sheet bundle set in a feed unit to the forming unit and the access unit. The sheet bundle includes a plurality of sheets stacked to one another, each sheet being attached with a storage tag at an attachment position and having a thickness larger at the attachment position than other positions thereof. The plurality of sheets includes a plurality of kinds of sheets which have different attachment positions when the sheet bundle is viewed from a direction orthogonal to a surface of the sheets.

According to the configuration of [19], the sheet bundle includes a plurality of kinds of sheets having different attachment positions when viewed from the direction orthogonal to the sheet surface. Therefore, the attachment positions are dispersed without concentrating on one position, thereby reducing unevenness in the sheet bundle. As a result, the sheets can be smoothly fed.

What is claimed is:

1. A sheet bundle with storage tags, comprising:
a plurality of sheets stacked on one another, each sheet having a storage tag attached at an attachment position and having a thickness larger at the attachment position than other positions thereof, the plurality of sheets including a plurality of kinds of sheets which have different attachment positions when the sheet bundle is viewed from a direction orthogonal to a surface of the sheets, each of the sheets having four areas defined by dividing each of the sheets by a center in a short side direction and a center in a long side direction;
wherein the plurality kinds of sheets are overlapped such that the attachment positions sequentially move between the four areas on a sheet-by-sheet basis, the attachment positions of every four sheets are provided in the four areas, respectively, the attachment positions are different from each other in each of the four areas such that in a stack of more than four sheets, the storage tags do not overlap in any direction orthogonal to a surface of the sheets, and a position of a gravity center of the storage tags for every four sheets is provided at the center of the sheets.

2. The sheet bundle according to claim 1,
wherein each of the sheets has a rectangular shape, and
wherein the attachment positions of the plurality of kinds of sheets are provided on both sides with respect to a center in one side direction of the sheets.

3. The sheet bundle according to claim 2,
wherein when the sheet bundle is viewed from the direction orthogonal to the surface of the sheets, the position of a gravity center for all of the storage tags is provided at the center in the one side direction of the sheets.

4. The sheet bundle according to claim 2,
wherein that the attachment positions of the plurality of kinds of sheets are provided on both sides with respect to a center in a direction orthogonal to the one side direction of the sheets.

5. The sheet bundle according to claim 4,
wherein when the sheet bundle is viewed from the direction orthogonal to the surface of the sheets, the position of a gravity center for all of the storage tags is provided at the center of the sheets.

6. The sheet bundle according to claim 1,
wherein a substantially same number of storage tags are provided at the respective attachment positions.

7. The sheet bundle according to claim 1,
wherein the plurality of sheets are stacked such that the sheets having different attachment positions are provided at every predetermined number of sheets.

8. The sheet bundle according to claim 7,
wherein the plurality of sheets are stacked such that the sheets having different attachment positions are provided at every single sheet.

9. The sheet bundle according to claim 1,
wherein the plurality of sheets are stacked such that a same number of storage tags are provided at the respective attachment positions for every predetermined number of sheets.

10. The sheet bundle according to claim 1,
wherein the plurality of sheets are stacked such that the attachment positions are changed in a predetermined sequence.

11. The sheet bundle according to claim 1,
wherein the attachment positions of all the plurality of sheets are different.

12. A system comprising:
the sheet bundle according to claim 1; and
an image forming apparatus,
    wherein the sheet bundle is used in the image forming apparatus which includes:
    a feed unit;
    a forming unit configured to form an image on a sheet;
    an access unit configured to perform an access operation including at least one of writing and reading of data with respect to a storage tag; and
    a transport unit configured to transport a sheet,
    wherein the transport unit includes a feed roller configured to contact an uppermost sheet of the sheet bundle set in the feed unit and rotate to feed the uppermost sheet, and
    wherein at least a part of each of the attachment positions is provided outside a contact range of the feed roller.

13. A system comprising:
the sheet bundle according to claim 1; and,
an image forming apparatus,
    wherein the sheet bundle is used in the image forming apparatus which includes:
    a forming unit configured to form an image within an image forming range which is a part of a sheet;
    an access unit configured to perform an access operation including at least one of writing and reading of data with respect to a storage tag; and a transport unit configured to transport a sheet, and
    wherein at least a part of each of the attachment positions is provided outside the image forming range.

14. A system comprising:
the sheet bundle according to claim 1 and
an image forming apparatus,
    wherein the sheet bundle is used in the image forming apparatus which includes: a forming unit configured to form an image on a sheet; an access unit configured to perform an access operation including at least one of writing and reading of data with respect to a storage tag within a access range; and a transport unit configured to transport a sheet, and
    wherein the attachment positions are provided within the access range.

15. The sheet bundle according to claim 1, wherein the plurality kinds of sheets are overlapped such that the attachment positions thereof sequentially move between the four areas on the sheet-by-sheet basis, and make one round for every four sheets.

16. The sheet bundle according to claim 1, wherein in each of the four areas, the attachment positions are different from each other such that a distance between each of the attachment positions and the center of the sheets become smaller from one surface of the sheet bundle to an opposite surface of the sheet bundle.

17. A method of manufacturing a sheet bundle including a plurality of kinds of sheets, each having a storage tag attached at an attachment position and having a thickness larger at the attachment position than other positions thereof, the method comprising:
    stacking the plurality of kinds of sheets on one another, the plurality kinds of sheets having different attachment positions when viewed from a direction orthogonal to a surface of the sheets, each of the sheets having four areas defined by dividing each of the sheets by a center in a short side direction and a center in a long side direction; and
    overlapping the plurality of kinds of sheets such that the attachment positions sequentially move between the four areas on a sheet-by-sheet basis, the attachment positions of every four sheets are provided in the four areas, respectively, the attachment positions are different from each other in each of the four areas such that in a stack of more than four sheets, the storage tags do not overlap in any direction orthogonal to a surface of the sheets, and a position of a gravity center of the storage tags for every four sheets is provided at the center of the sheets.

18. The method according to claim 17,
wherein the stacking is performed such that a substantially same number of storage tags are provided at the respective attachment positions.

19. The method according to claim 17,
wherein the stacking is performed such that a same number of storage tags are provided at the respective attachment positions for every predetermined number of sheets.

20. The method according to claim 17,
wherein the stacking is performed such that the attachment positions are changed in a predetermined sequence.

21. A sheet transport mechanism in an image forming apparatus which includes: a forming unit configured to form an image on a sheet; and an access unit configured to perform an access operation including at least one of writing and reading of data with respect to a storage tag attached to the sheet, the sheet transport mechanism comprising:
    a transport unit configured to feed and transport a sheet of a sheet bundle set in a feed unit to the forming unit and the access unit,
    wherein the sheet bundle includes a plurality of sheets stacked on one another, each sheet having a storage tag attached at an attachment position and having a thickness larger at the attachment position than other positions thereof, the plurality of sheets including a plurality of kinds of sheets which have different attachment positions when the sheet bundle is viewed from a direction orthogonal to a surface of the sheets, each of the sheets having four areas defined by dividing each of the sheets by a center in a short side direction and a center in a long side direction;

wherein the plurality kinds of sheets are overlapped such that the attachment positions sequentially move between the four areas on a sheet-by-sheet basis, the attachment positions of every four sheets are provided in the four areas, respectively, the attachment positions are different from each other in each of the four areas such that in a stack of more than four sheets, the storage tags do not overlap in any direction orthogonal to a surface of the sheets, and a position of a gravity center of the storage tags for every four sheets is provided at the center of the sheets.

* * * * *